G. W. Wilbar,
Line Fastener.

No. 99,385.  Patented Feb. 1, 1870.

Witnesses.
Leonard T. Talbot
Chas. H. Stephens

George W. Wilbar
Inventor

United States Patent Office.

GEORGE W. WILBAR, OF TAUNTON, MASSACHUSETTS.

Letters Patent No. 99,385, dated February 1, 1870.

IMPROVED CLOTHES-LINE CLAMP.

The Schedule referred to in these Letters Patent and making part of the same.

To whom it may concern:

Be it known that I, GEORGE W. WILBAR, of Taunton, in the county of Bristol, and State of Massachusetts, have invented a new and useful article or machine for securing clothes-lines, when stretched for use, which I have termed a Clothes-Line Fastener.

My invention consists in the combination of a cam and the arc of a circle, in such a manner that a line placed between the two may be held firmly in its place, when the strain or tension upon the line is in one direction, or allowed to move, when in the opposite direction.

In the accompanying drawings, making a part of this specification—

Figure 1:
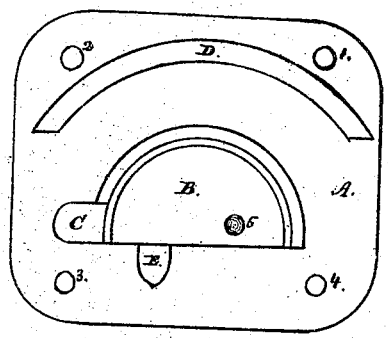

Figure 1 is a plan of the machine, and

Figure 2:
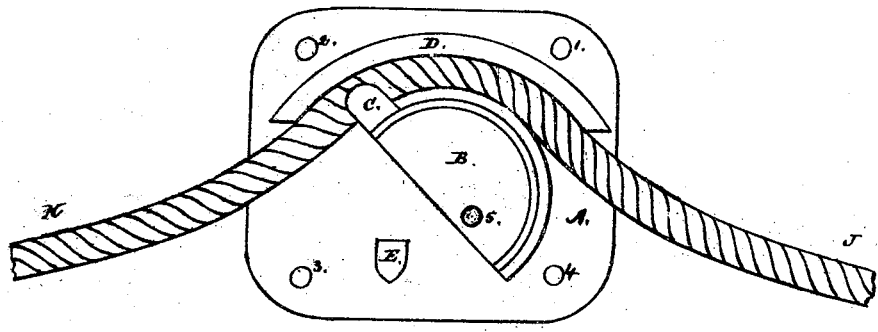

Figure 2, the same, showing a line secured therein.

A is the plate or foundation-piece, which is made of metal, and secured by screws, 1; 2, 3, and 4, to a post, building, or wherever desired.

B is the cam, which is attached to the plate A by the rivet or bolt 5, and upon which it partially rotates.

C is a lip or projection on the face of the cam B, to prevent the line from being removed by any side strain from its place between the cam and the arc. This strain occurs when the clothes hung upon the line are blown by the wind.

D is the arc of a circular band, firmly attached to or cast in the same piece with the plate A. Against this arc the line is pressed by the cam B, thus holding the line firmly, when it is drawn in the direction of J, or releasing it, when drawn in the opposite direction.

E is a stop, also cast upon the plate A, to prevent the cam, when not in use, from dropping down further than is required to open a sufficient space between the cam and the arc to admit the line.

J K is a portion of a line secured in the machine.

The line is made fast at one end, passed over the cam, drawn as taut as may be desired, and is secured there by the action of the cam.

These fasteners should be made either right or left-handed, as the line, when coming from one direction, requires the cam to turn to the left hand, and, when coming from the other direction, to the right hand.

I claim as my invention, and desire to secure by Letters Patent—

The combination of the cam B, the arc or rim D, the lip C, and the stop E, substantially as and for the purpose hereinbefore set forth, the whole forming a new article of manufacture.

GEO. W. WILBAR.

Witnesses:
    LEML. T. TALBOT,
    CHAS. H. STEPHENS.